Aug. 11, 1931.   F. W. HOESING   1,818,256
TRACTOR HITCH
Filed Jan. 2, 1930   2 Sheets-Sheet 2

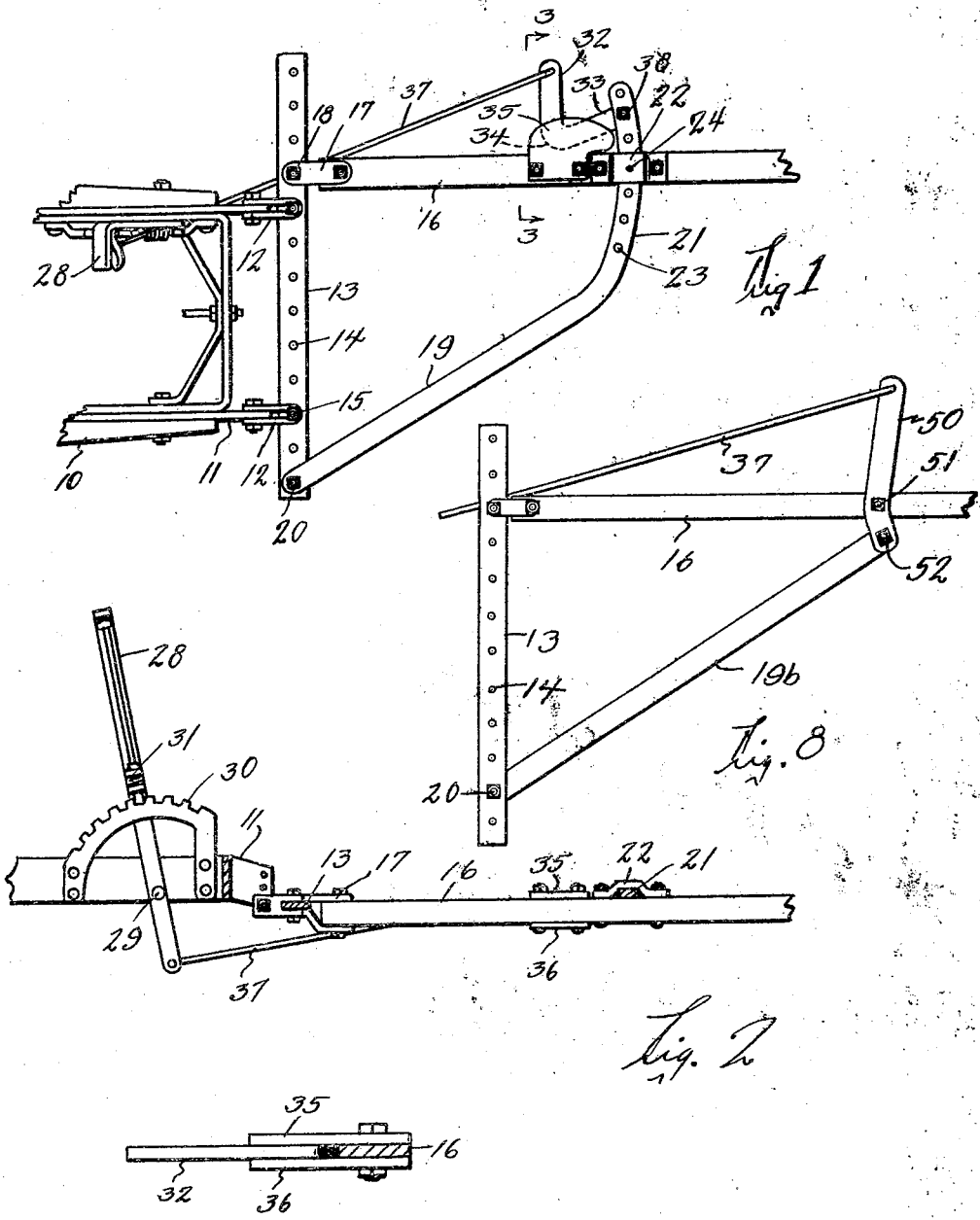

Inventor
Fred W. Hoesing
By Lynn R. Latta
Attorney

Patented Aug. 11, 1931

1,818,256

UNITED STATES PATENT OFFICE

FRED W. HOESING, OF ST. HELENA, NEBRASKA

TRACTOR HITCH

Application filed January 2, 1930. Serial No. 418,133.

My invention relates to tractor hitches of the shiftable or adjustable type ordinarily employed for connecting a plow to a tractor. Lateral shifting of the plow relative to the tractor is a well-recognized need that has been provided for in laterally adjustable tractor hitches and some of these have been made shiftable while the plow and tractor are in motion.

As far as I am aware, the only hitch providing for shifting during movement of the ensemble is one in which the shifting force is applied at a point considerably to one side of the draft tongue, namely between the rear end of the shift bar and the draft beam. It will be understood in this connection that a hitch of the type under consideration embodies a draft tongue adapted to be connected to the tractor, a draft beam pivotally connected to the tongue at its rear end and positioned transversely thereto and connected to the plow or trailing body and a shift bar acting as a brace between the draft beam and tongue and forming therewith a triangular shaped structure.

I have found that the operation of the hitch mentioned above, in which shifting power is applied between the rear end of the shift bar and the draft beam is subject to the criticism that a great deal of force must be applied to the shifting lever in order to accomplish the shifting. This is probably due to the fact that the power is applied at a point which is considerably removed in a lateral direction from the draft tongue and to the fact that the direct pull between the shift bar and draft beam is imposed upon the shifting lever. I have found that by employing an arrangement in which the shifting lever is mounted on the plow or trailing body substantially in line with the draft tongue and the shifting force applied between the draft tongue and shift bar near the intersection of the two, that the amount of power required for shifting is considerably decreased. My invention therefore has for its object to provide a hitch including means for shifting during movement of the tractor to which it is attached, said means being arranged so as to require less power for the shifting operation.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of the hitch and a portion of a plow to which it is attached.

Fig. 2 is a sectional view taken longitudinally through the hitch.

Fig. 3 is a detail, sectional view taken on the line 3—3 of Fig. 1.

Fig. 8 shows a further modified form of my invention attached to the hitch of Fig. 5.

Figure 4:
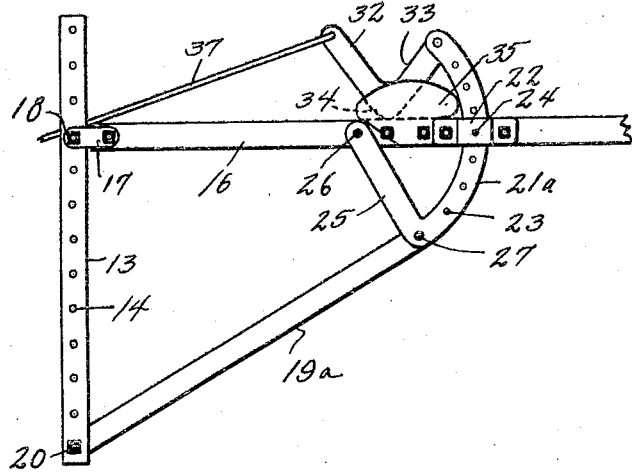
Fig. 4 is a plan view of a modified form of the hitch with my invention attached.

I have used the reference character 10 to indicate generally the frame of a plow, said frame including a pair of plates 11, to which are pivoted clevices 12 for the attachment of the plow hitch draft beam.

The draft beam is indicated by the reference character 13 and is provided with a plurality of spaced openings 14 to receive securing elements.

The clevices 12 are secured to the draft beam 13 by means of bolts 15, extended through the openings 14 and through the clevices.

The draft tongue 16 is pivoted to the beam 13 by means of a link 17 and a bolt 18 extending through the link and through one of the openings 14.

The bar 19 is pivoted at one end to the draft beam 13 by means of the bolt 20 extended through one of the openings 14 and at its other end in the form shown in Fig. 1 is provided with an integral bar portion 21, which is slidably extended beneath a yoke 23, secured to the tongue 16. Openings 23 in the bar portion 21 are adapted to register with openings 24 in the yoke 22 and tongue 16, respectively, and to receive a pin (not shown) should it be desirable to secure the bar portion 21 in fixed relation to the tongue 16.

A modified form of the construction just described is that of Fig. 4, wherein the bar portion 21a is formed as a separate member having an arm 25, which is pivoted at 26 to the tongue 16. The bar portion 21a is curved around the pivot 26 as a center. The shift bar 19a is pivoted at 27 to the bar portion 21a.

Both of the structures just described are those of common types of shifts and my invention comprises the combination with these structures of the shifting mechanism, which will now be described.

I provide a shifting lever 28 which is pivoted at 29 to one of the plates 11 substantially in line with the tongue 16.

A sector 30 is secured to the plate 11 and a common form of pawl mechanism 31 is carried by the lever 28 to coact with the sector 30 to lock the lever 28 in any of its adjusted positions.

I provide means to act between the tongue 16 and the bar portion 21 comprising an L shaped member having the arms 32 and 33, connected by an elbow 34, which is slidably engaged against the edge of the bar 16.

The L shaped member is supported between a pair of plates 35 and 36, which are secured one on either side of the tongue 16, as shown in Fig. 3.

The arm 32 is connected by a link 37 to the lever 28 and the arm 33 is connected by a bolt 38 to the bar portion 21. The bolt 38 extends through one of the openings 23 and the angular position of the shift bar 19 relative to the tongue may be varied by shifting the bolt 38 from one opening 23 to another.

In the operation of the hitch, when the lever 28 is pushed forwardly, the arm 32 will be pulled rearwardly and the arm 33 will move away from the tongue 16, the elbow 34 being fulcrumed against the edge of the tongue 16. As the above movement takes place, the elbow 34 will slide relative to the tongue 16. This sliding movement allows the L shaped member to follow the path of movement of the bar portion 21, which is substantially perpendicular to the tongue 16.

The change in the relative positions of the tongue, the beam and the shift bar accompanying the movement above described will be well understood from a contemplation of the prior structures wherein this same movement takes place.

My invention resides in the application of the power to the shift bar at its forward end, the amount of relative movement between the tongue and draft beam being much less in the present case than in the construction where the power is applied to the rear end of the shift bar.

Accompanying the smaller movement is an increased leverage, making the shifting of the hitch much easier. Another form of hitch is that shown in Fig. 5, wherein the shift bar 19b is connected with the tongue 16 by means of a sleeve 40, slidably mounted on the tongue 16 and comprising a pair of plates connected by bolts 41. To one of the bolts 41 is secured the shift bar 19b, the end of the bar being positioned between the plates of the sleeve.

In order to apply my invention to this form of the hitch, I provide a yoke 42, secured to the tongue 16 and a cam 43 is provided with a pair of cam fingers 44, which are spaced apart so as to receive the shift bar 19b but to engage the edges of the sleeve 40. The shaft 45 of the cam 43 is provided with a squared end 46 to receive an arm 47, which is secured to the squared end by means of a nut 48. The arm 47 is connected by means of the link 37 to the shifting lever, which is the same as in Fig. 1.

It will readily be seen that when the lever is moved forwardly, the arm 47 will be drawn rearwardly, causing the cam 43 to rotate against the sleeve 40, pulling the sleeve forwardly.

Figure 5:
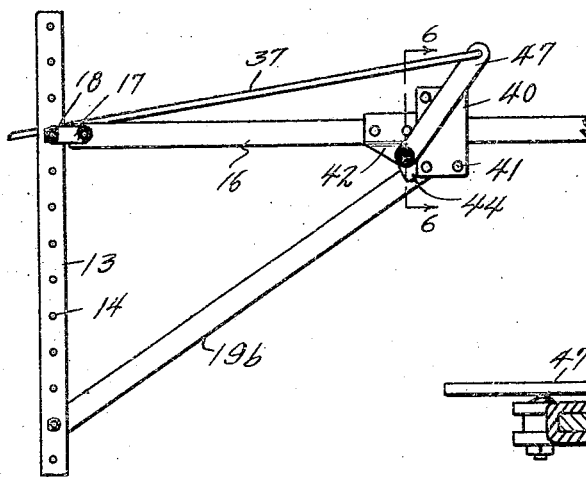
Fig. 5 is a further modified form of the hitch with my invention attached.
Figure 6:
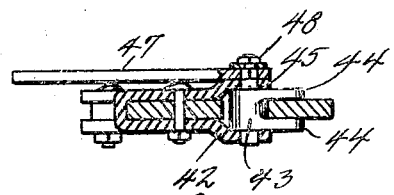
Fig. 6 is a detail, sectional view taken on the line 6—6 of Fig. 5.
Figure 7:
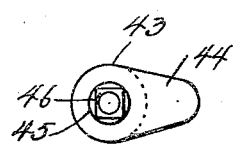
Fig. 7 is a plan view of the cam employed in that form of the invention shown in Fig. 5.

In Fig. 8 is shown another form of the invention, applied to the hitch illustrated in Fig. 5. The members 40 and 42 of Fig. 5 are removed and instead of the lever 47, I employ a lever 50, extending across the beam 16 and pivoted at the beam at 51. The bar 19b is pivoted at 52 to the lever 50. The operation is the same as in the other forms described.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In a tractor hitch, a trailing body, a draft beam secured to the body, a draft tongue pivotally connected to the beam, a shift bar pivotally connected to the beam at a point spaced from the tongue connection, and provided with a portion slidably connected to the tongue intermediate its ends, for movement transversely thereof, a shift lever pivoted to the body substantially in line with the tongue, for relative longitudinal movement of the tongue, means to secure the lever in any of several adjusted positions, and means connecting the lever to the shift bar portion near the intersection of the bar portion and the tongue, to convert movement of the lever into movement of the shift bar portion transversely of the tongue.

2. In a tractor hitch, a trailing body, a draft beam secured to the body, a draft tongue pivotally connected to the beam, a shift bar pivotally connected to the beam at a point spaced from the tongue connection, and provided with a portion slidably connected to the tongue intermediate its ends, for movement transversely thereof, a shift lever pivoted to the body substantially in line with the tongue, for relative longitudinal movement of the tongue, means to secure the lever in any of several adjusted positions, an arm provided with means acting between the tongue and bar portion to convert movement of the arm longitudinally of the tongue, into movement of the bar portion transversely of the tongue, and a link connecting the arm to the lever.

3. In a tractor hitch, a trailing body, a draft beam secured to the body, a draft tongue pivotally connected to the beam, a shift bar pivotally connected to the beam at a point spaced from the tongue connection, and provided with a portion slidably connected to the tongue intermediate its ends, for movement transversely thereof, a shift lever pivoted to the body substantially in line with the tongue, for relative longitudinal movement of the tongue, means to secure the lever in any of several adjusted positions, an L shaped member comprising a pair of arms, connected by an elbow, a link connecting one of the arms to the lever, the other arm being connected to the bar portion and the elbow being slidably engaged against the tongue, whereby movement of the lever will cause the bar portion to shift transversely of the tongue.

4. In a tractor hitch, a trailing body, a draft beam secured to the body, a draft tongue pivotally connected to the beam, a shift bar pivotally connected to the beam at a point spaced from the tongue connection, and provided with a portion slidably connected to the tongue intermediate its ends, for movement transversely thereof, a shift lever pivoted to the body substantially in line with the tongue, for relative longitudinal movement of the tongue, means to secure the lever in any of several adjusted positions, an L shaped member comprising a pair of arms, connected by an elbow, a link connecting one of the arms to the lever, the other arm being connected to the bar portion and the elbow being slidably engaged against the tongue, whereby movement of the lever will cause the bar portion to shift transversely of the tongue, and a pair of guide members between which the L shaped member is supported.

5. In a tractor hitch, a trailing body, a draft beam secured to the body, a draft tongue pivotally connected to the beam, a shift bar pivotally connected to the beam at a point spaced from the tongue connection, and provided with a portion slidably connected to the tongue intermediate its ends, for movement transversely thereof, a shift lever pivoted to the body substantially in line with the tongue, for relative longitudinal movement of the tongue, means to secure the lever in any of several adjusted positions, an L shaped member comprising a pair of arms, connected by an elbow, a link connecting one of the arms to the lever, the other arm being connected to the bar portion and the elbow being slidably engaged against the tongue, whereby movement of the lever will cause the bar portion to shift transversely of the tongue, and a pair of guide members between which the L shaped member is supported, comprising a pair of plates secured to the upper and lower faces of the tongue.

6. In a tractor hitch, a trailing body, a draft beam secured to the body, a draft tongue pivotally connected to the beam, a shift bar pivotally connected to the beam at a point spaced from the tongue connection, and provided with a portion slidably connected to the tongue intermediate its ends, for movement to change the angularity of the beam relative to the tongue, a shift lever pivoted to the body substantially in line with the tongue, for relative longitudinal movement of the tongue, means to secure the lever in any of several adjusted positions, and means connecting the lever to the bar portion near the intersection of the bar portion and the tongue, to convert movement of the lever into movement of the shift bar relative to the tongue.

7. In a tractor hitch, a trailing body, a draft beam secured to the body, a draft tongue pivotally connected to the beam, a shift bar pivotally connected to the beam at a point spaced from the tongue connection, a shift lever pivoted to the body for relative longitudinal movement of the tongue and substantially in line with the tongue, a lever pivoted to the shift bar at its forward end, pivoted to the tongue and extending across the tongue, and a link connecting the two levers.

8. In a tractor hitch, a trailing body, a draft beam secured to the body, a draft tongue pivotally connected to the beam, a shift bar pivotally connected to the beam at a point spaced from the tongue connection, a yoke slidably mounted on the tongue and comprising a pair of members between which an end of the shift bar is pivoted, a shift lever pivoted to the body for relative longitudinal movement of the tongue and substantially in line with the tongue, a cam, journalled on the tongue, and provided with a pair of spaced cam fingers receiving between them the shift bar and engaging the yoke members, an arm secured to the cam, and a link connecting the arm to the lever.

9. In a tractor hitch, a trailing body, a draft beam secured to the body, a draft tongue pivotally connected to the beam, a shift bar pivotally connected to the beam at a point spaced from the tongue connection and provided with a portion extending toward the tongue and away from the beam, a member inter-engaging between the tongue and the shift bar so as to move the latter relative to the tongue and to thereby change the angularity of the beam relative to the tongue, a shift lever pivoted to the body substantially in line with the tongue for relative longitudinal movement of the tongue, means to secure the lever in any of several adjusted positions and means connecting the lever to said member to transmit movement of the lever to said member.

Signed this 30th day of December, 1929, in the county of Woodbury and State of Iowa.

FRED W. HOESING.